Sept. 17, 1935.  J. C. WOODHOUSE  2,014,408
PROCESS FOR THE PREPARATION OF METHYL ETHER
Filed May 28, 1931
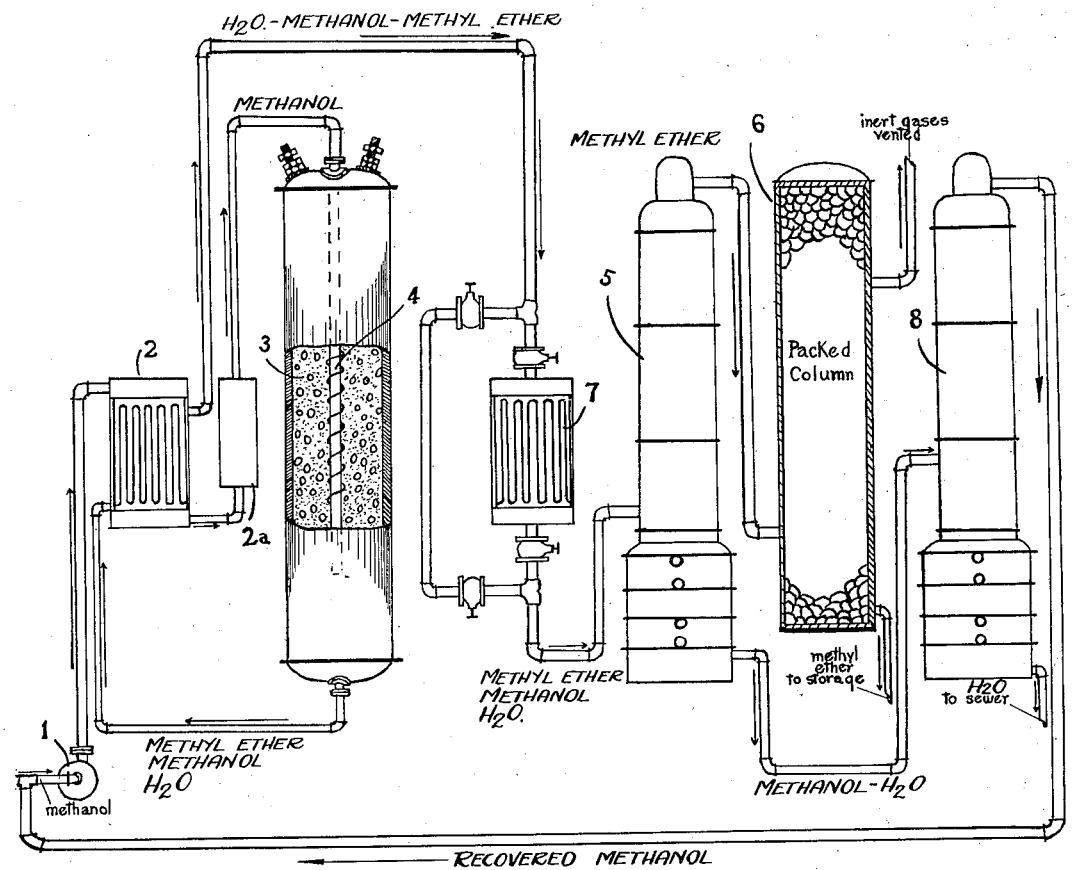
John C. Woodhouse Inventor Patented Sept. 17, 1935

2,014,408

UNITED STATES PATENT OFFICE 2,014,408

PROCESS FOR THE PREPARATION OF METHYL ETHER

John C. Woodhouse, Wilmington, Del., assignor to E. I. du Pont de Nemours & Company, Wilmington, Del., a corporation of Delaware Application May 28, 1931, Serial No. 540,796

6 Claims. (Cl. 260—151)

This invention relates to a process for the preparation of ethers and more particularly to a process for the preparation of methyl ether by passing methanol over a dehydrating catalyst.

Various experimental and laboratory processes have been described heretofore for the preparation of methyl ether but, such processes have been relatively inefficient and unadapted for commercial operation. An object of the present invention is to provide a commercially operable process for the preparation of methyl ether from methanol and, further, to describe an efficient and economical apparatus for conducting this process.

Other objects and advantages of the invention will be understood by reference to the following specification and to the accompanying drawing, in which—

The single figure is a diagrammatic showing of one form of apparatus particularly well adapted for effecting the present process.

My invention deals particularly with the preparation of methyl ether by passing methanol over a suitable dehydrating catalyst, the reaction being conducted under elevated temperature and pressure. In the practical application of the invention the methyl alcohol or other alcohol or mixtures, thereof, after preheating to approximately the temperature at which the conversion is effected, is passed into any suitable type of converter which is adapted for the carrying out of slightly exothermic gaseous reactions, the pressure and temperature within the converter being controlled within proper limits. A substantial part of the alcohol is converted into ether and passes from the converter preferably to a heat interchanger which may be employed for the initial heating of the incoming alcohol. The gases from the heat interchanger, which generally contain together with the ether, small amounts of alcohol and water vapor, are then passed into a distillation column wherein the unconverted alcohol and water are separated from the ether, the ether being directed into a condenser preferably operated under a suitable pressure, from which condenser the liquid ether is passed to storage.

In order that those skilled in the art may more fully and completely understand this invention, a description of my process for the preparation of methyl ether from methanol will be given with reference to the figure,—the methanol from any suitable supply not shown is forced by the pump (1) into the heat interchanger (2), herein it is preheated by heat interchange with the exit gases from the converter. From the heat interchanger (2) the methanol is, if necessary, heated to reaction temperature in the preheater (2a) which utilizes some auxiliary heating medium such as an electrical heater. The thus heated vapors are then passed directly into the converter (3) which is provided with a suitable type of dehydrating catalyst. Electrical means (4) are provided for accurate control of the temperature within the converter. From the converter the gases, after repassing through the heat interchanger (2), may be directly injected into the distillation column (5), which is provided with some type of heating means, such, for example, as internal heating coils. The methyl ether is separated from the methanol and water and passes from the top of the distillation column (5) and is contacted in the condenser (6) with sufficient cooling surfaces to condense it to a liquid, under the pressure employed in the system. From the bottom of this condenser the methyl ether passes directly to pressure storage. The inert uncondensable gases, are vented from the top of the condenser column (6). In lieu of passing the methyl ether, methanol, and water directly from the heat exchanger (2) into the distillation column (5) they may be passed into the condenser (7) wherein this fluid mixture may be partly or completely liquefied and in that phase may be directed into the distillation column (5) for ether separation. From the bottom of the distillation column (5) the methanol and water is passed into the rectifying column (8) in which the methanol is separated from the water, which latter passes from the bottom of this column to the sewer, while the recovered methanol is returned to the system.

In order that the methyl ether may be condensed to a liquid in the condenser (6) by employing ordinary cooling water, which seldom attains a temperature below 20° C., I find that for this purpose a pressure within this condenser should ordinarily be maintained in the proximity of 100 pounds per square inch, or better. I prefer to operate at such pressures that discharge of the methyl ether will take place into the shipping containers, or other vessels, from the storage system without the need of auxiliary pressure. Furthermore, efficient conversion within the converter (3) takes place at a pressure above 100 pounds and generally up to 3000 pounds per square inch. I have found that methanol synthesized, for example, from hydrogen and a carbon oxide which is obtained directly from the high temperature and pressure synthesis apparatus is particularly well adapted to maintain such pressures within the above system. The uncondensed methanol-containing gases, from methanol synthesis after reducing the pressure to the desired limit, and regulating the temperature in the neighborhood of 375° C., may be passed directly into the converter of my process, without the necessity of using the preheating step above described, and without the necessity of employing auxiliary pressure.

When employing methanol, from whatever source, and at a temperature above approximately 175° C., care must be exercised in order that the methyl alcohol be not cracked to hydrogen and carbon monoxide. It is advisable, therefore, that all apparatus with which the methanol contacts, prior to its conversion, be composed of or lined or plated with aluminum or some other metal or compound which does not catalyze the breaking down or cracking of the methanol.

By utilizing the heat content of the gases from the converter (3) little additional heat is required in the distillation column (5), ordinarily low temperature steam or even in some instances hot water is sufficient to give the necessary refluxing for the separation of the methyl ether from the methanol and water.

While the apparatus here described is primarily for continuous operation, it may, of course, be intermittently operated. This may be effected by completely condensing the conversion products in the condenser (7), charging the distillation column with this liquid mixture until the proper amount has been collected, and then distilling off the methyl ether in the usual manner.

The conversion of the methanol to methyl ether should be conducted at a temperature of from approximately 175–500° C., the preferable operating range being in the neighborhood of 350–400° C. The pressure in the converter may vary from 1 atmosphere to 200 atmospheres or more with the preferable operating range at approximately 15 atmospheres. The space velocity, which is the volume of the methanol (measured at standard temperature and pressure) passing per hour over a unit volume of the catalyst,—may vary between 200–30,000 with a preferable operating range at approximately 5000. There are several types of dehydrating catalysts which may be employed advantageously in my process such, for example, as aluminum oxide, hydrated aluminum oxide obtained by partially dehydrating aluminum hydroxide at a temperature of about 300° C., or partially hydrated titanium oxide, barium oxide, or silica gel. Basic aluminum sulfate may also be used. I prefer, however, to employ the aluminum phosphate catalyst disclosed in my co-pending application Serial No. 538,259, now Patent No. 1,949,344 dated Feb. 27, 1934.

Various changes may be made in the apparatus, method of operation, and details of procedure according to this invention without departing therefrom or sacrificing any of the advantages thereof.

I claim:

1. A process for the preparation of methyl ether which comprises passing methanol under elevated temperature and pressure over a dehydration catalyst, separating the unreacted methanol and water from the methyl ether by rectification at substantially the pressure of conversion and finally condensing the thus separated methyl ether to a liquid without substantial lowering of the pressure.

2. In a process for the preparation of methyl ether by the dehydration of methanol the steps which comprise passing methanol under elevated temperature and pressure over a heated dehydration catalyst, separating by rectification the unreacted methanol and water from the methyl ether at substantially the pressure of conversion, condensing the thus separated methyl ether to a liquid without substantial lowering of the pressure, and finally storing under substantially the same pressure the thus separated and liquefied methyl ether.

3. In a process for the preparation of methyl ether by the dehydration of methanol the steps which comprise passing methanol under elevated temperature and pressure over a dehydration catalyst, at a space velocity of from 200–30,000, utilizing the heat in the gases from the conversion reaction to aid in the rectification and separation of the unreacted methanol and water from the methyl ether, the rectification being effected at substantially the pressure of conversion and finally condensing the thus separated methyl ether to a liquid without substantial lowering of the pressure.

4. A circulatory process for the preparation of methyl ether which comprises passing methanol under elevated temperature and pressure over a dehydration catalyst, separating the methanol and water from the methyl ether in the conversion product, separating the methanol from the methanol-water mixture by rectification at substantially the pressure of conversion, adding the thus recovered methanol to raw methanol entering the system, and condensing the separated methyl ether to a liquid without appreciable reduction of pressure.

5. A circulatory process for the preparation of methyl ether which comprises preheating methanol to the reaction temperature, passing it while so preheated and under elevated pressure over a dehydration catalyst, separating the methanol and water from the methyl ether in conversion product, separating the methanol from the methanol-water mixture by rectification at substantially the pressure of conversion, adding the thus recovered methanol to raw methanol entering the system, and condensing the separated methyl ether to a liquid without appreciable reduction of pressure.

6. In a process for the preparation of methyl ether by the dehydration of methanol the steps which comprise passing methanol under elevated temperature and pressure over a heated dehydration catalyst, separating the unreacted methanol and water from the methyl ether at substantially the pressure of conversion while utilizing therefor the heat in the gases resulting from conversion, and finally condensing the thus separated methyl ether to a liquid and storing it in that phase without substantial lowering of the pressure.

JOHN C. WOODHOUSE.